United States Patent
Yahia et al.

(10) Patent No.: US 12,552,222 B2
(45) Date of Patent: Feb. 17, 2026

(54) THERMAL MANAGEMENT DEVICE FOR BATTERIES FOR AN ELECTRIC OR HYBRID VEHICLE

(71) Applicant: VALEO SYSTEMES THERMIQUES, Le Mesnil-Saint-Denis (FR)

(72) Inventors: Mohamed Yahia, Le Mesnil-Saint-Denis (FR); Stefan Karl, Le Mesnil-Saint-Denis (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 182 days.

(21) Appl. No.: 18/685,897

(22) PCT Filed: Aug. 30, 2022

(86) PCT No.: PCT/EP2022/074012
§ 371 (c)(1),
(2) Date: Feb. 23, 2024

(87) PCT Pub. No.: WO2023/031149
PCT Pub. Date: Mar. 9, 2023

(65) Prior Publication Data
US 2024/0367477 A1    Nov. 7, 2024

(30) Foreign Application Priority Data
Sep. 3, 2021 (FR) .................................. 2109268

(51) Int. Cl.
*B60H 1/00* (2006.01)
*B60H 1/32* (2006.01)
(Continued)

(52) U.S. Cl.
CPC ..... *B60H 1/00278* (2013.01); *B60H 1/32284* (2019.05); *B60H 1/323* (2013.01); *H01M 10/625* (2015.04); *H01M 10/6568* (2015.04)

(58) Field of Classification Search
CPC ............ B60H 1/00278; B60H 1/32284; B60H 1/323; H01M 10/625; H01M 10/6568
(Continued)

(56) References Cited

U.S. PATENT DOCUMENTS

2021/0001686 A1    1/2021   Kim et al.

FOREIGN PATENT DOCUMENTS

CN    109860942 A  *  6/2019  .......... H01M 10/625
CN    110001352 A     7/2019
(Continued)

OTHER PUBLICATIONS

International Search Report issued in corresponding International Application No. PCT/EP2022/074012 mailed Dec. 9, 2022 (5 pages).
(Continued)

*Primary Examiner* — Davis D Hwu
(74) *Attorney, Agent, or Firm* — Osha Bergman Watanabe & Burton LLP

(57) ABSTRACT

A thermal management device for an electric or hybrid motor vehicle is disclosed. The device includes a cooling circuit configured to circulate a refrigerant fluid, a circuit for thermal management of the batteries by at least partial immersion and/or vaporization, and a circuit for thermal management of the power electronics. The cooling circuit includes a main loop including, in the direction of circulation of the refrigerant, a compressor, a first heat exchanger, a second heat exchanger, a first expansion device, and a third heat exchanger. The battery thermal management circuit includes a main loop including a first pump, a fourth heat exchanger, and a container configured to receive the batteries. The power electronic thermal management circuit includes a second pump, a heat exchanger, a first radiator, and a second heat exchanger.

10 Claims, 13 Drawing Sheets

Figure 1:
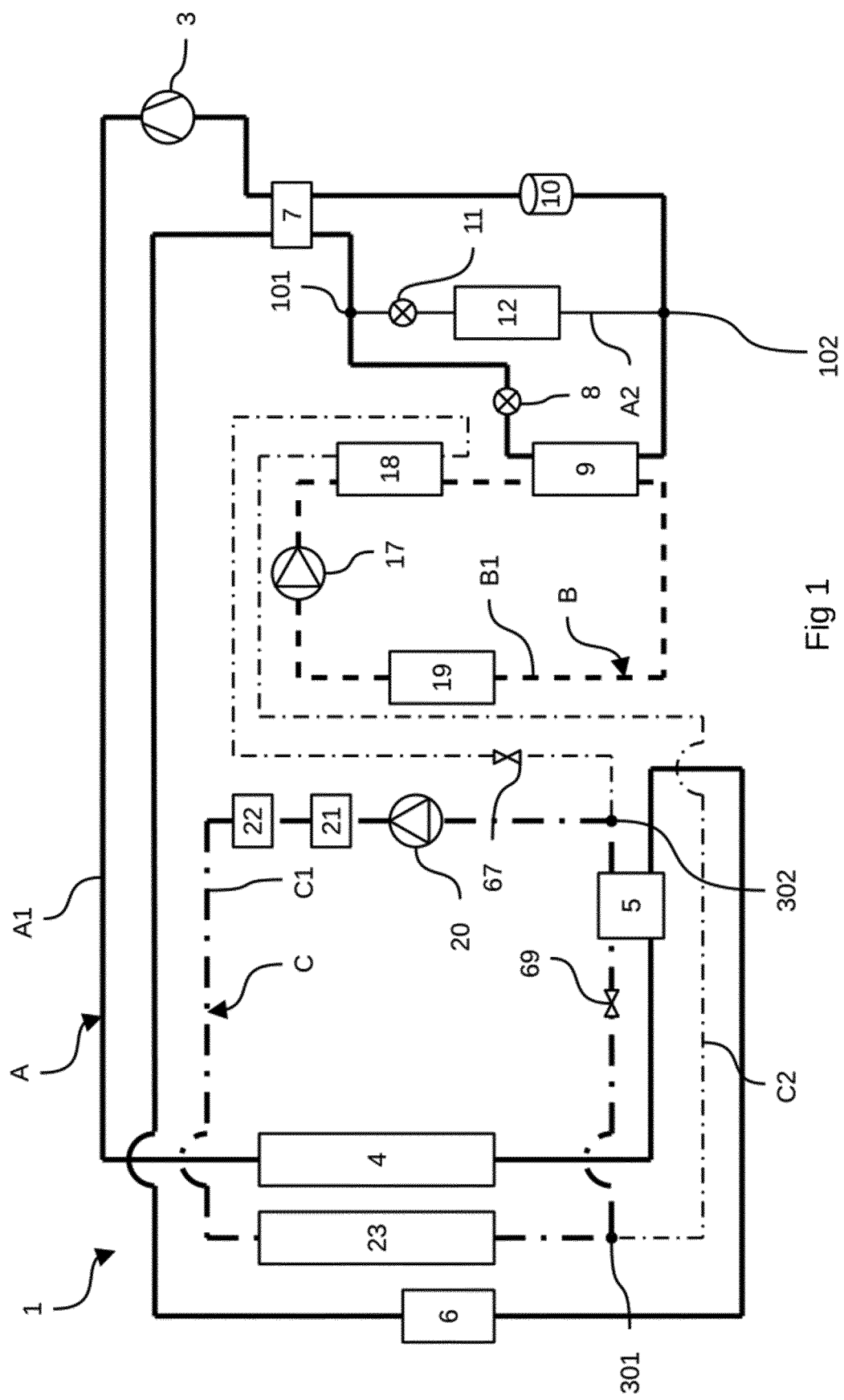

(51) Int. Cl.
*H01M 10/625* (2014.01)
*H01M 10/6568* (2014.01)

(58) Field of Classification Search
USPC .......................................... 165/202
See application file for complete search history.

(56) References Cited

FOREIGN PATENT DOCUMENTS

| | | | | |
|---|---|---|---|---|
| CN | 111295555 A | * | 6/2020 | ......... B60H 1/32281 |
| CN | 113147323 A | | 7/2021 | |
| FR | 3076664 A1 | | 7/2019 | |

OTHER PUBLICATIONS

Written Opinion issued in corresponding International Application No. PCT/EP2022/074012 mailed Dec. 9, 2022 (7 pages).

* cited by examiner

THERMAL MANAGEMENT DEVICE FOR BATTERIES FOR AN ELECTRIC OR HYBRID VEHICLE

The invention relates to the field of electric and hybrid motor vehicles and more particularly to a thermal management device for the batteries of such a motor vehicle.

Current electric or hybrid motor vehicles increasingly have means for the thermal management of the batteries and means for the thermal management of the components of the electric powertrain, such as the power electronics and/or the electric motor of said electric vehicle. Specifically, in order for these batteries and these components to be as efficient as possible, they need to remain at an optimum operating temperature. It is therefore necessary to cool them during use to ensure that they do not exceed this optimum operating temperature by too great an extent. Likewise, it can also be necessary to heat them, for example in cold weather, so that they reach this optimum operating temperature in the shortest possible time. In addition, these elements can have different optimum operating temperatures, requiring each of them to be thermally managed in a different way.

For efficient thermal management of the batteries, the use of a circuit for thermal management of the batteries by at least partial immersion and/or vaporization onto the batteries is known. A dielectric heat transfer fluid is intended to circulate in this circuit for thermal management of the batteries by at least partial immersion and/or vaporization. This circuit for thermal management of the batteries by at least partial immersion and/or vaporization is generally associated with a cooling circuit having a cooler. The components of the electric powertrain, for their part, are generally associated with a circuit for circulation of a heat transfer fluid having a radiator for cooling these components.

However, in certain conditions, for example when the requirements for cooling the batteries are relatively low, the cooling power of the cooling circuit is too high and its use causes a low performance coefficient.

One of the objectives of the present invention is therefore to at least partly eliminate the disadvantages of the prior art and to propose an improved management device, notably which retains a satisfactory performance coefficient even for limited cooling of the batteries.

The present invention therefore relates to a thermal management device for an electric or hybrid motor vehicle, comprising:
- a cooling circuit, in which a refrigerant fluid is intended to circulate and which comprises a main loop having the following in the direction of circulation of the refrigerant fluid: a compressor, a first heat exchanger, a second heat exchanger, a first expansion device and a third heat exchanger,
- a circuit for thermal management of the batteries by at least partial immersion and/or vaporization, in which a dielectric heat transfer fluid is intended to circulate, said circulation circuit for thermal management of the batteries by at least partial immersion and/or vaporization comprising a main loop having a first pump, a fourth heat exchanger and a container configured to receive the batteries, the third heat exchanger being connected both to the main loop of the cooling circuit and to the main loop of the circuit for thermal management of the batteries by at least partial immersion and/or vaporization, the fourth heat exchanger being disposed upstream of the third heat exchanger and downstream of the container,
- a circuit for thermal management of the power electronics, in which a heat transfer fluid is intended to circulate and which comprises a main loop comprising a second pump, at least one heat exchanger for exchanging heat with a component of the electric powertrain, a first radiator, and the second heat exchanger connected both to the main loop of the cooling circuit and to the main loop of the circuit for thermal management of the power electronics, the circuit for thermal management of the power electronics moreover having a first bypass branch, said first bypass branch having the fourth heat exchanger, the fourth heat exchanger being connected both to said first bypass branch of the circuit for thermal management of the power electronics and to the main loop of the circuit for thermal management of the batteries by at least partial immersion and/or vaporization.

According to one aspect of the invention, the first bypass branch of the circuit for thermal management of the power electronics connects a first junction point disposed on the main loop of the circuit for thermal management of the power electronics downstream of the first radiator, between said first radiator and the second heat exchanger, to a second junction point disposed on the main loop of the circuit for thermal management of the power electronics downstream of the second heat exchanger, between said second heat exchanger and the at least one heat exchanger for exchanging heat with a component of the electric powertrain.

According to another aspect of the invention, the first bypass branch of the circuit for thermal management of the power electronics connects a first junction point disposed on the main loop of the circuit for thermal management of the power electronics downstream of the first radiator, between said first radiator and the second heat exchanger, to a second junction point disposed on the main loop of the circuit for thermal management of the power electronics downstream of the first junction point, between said first junction point and the second heat exchanger.

According to another aspect of the invention, the circuit for thermal management of the power electronics has a second bypass branch connected to the main loop in parallel with the first radiator.

According to another aspect of the invention, the cooling circuit is reversible.

According to another aspect of the invention, the cooling circuit has:
- a second bypass branch connecting a third junction point, disposed on the main loop downstream of the second heat exchanger, to a fourth junction point disposed upstream of the compressor,
- a third bypass branch disposed on the main loop and connecting a fifth junction point, disposed on the main loop downstream of the compressor, between said compressor and the first heat exchanger, to a sixth junction point disposed on the main loop downstream of the fifth junction point, between said fifth junction point and the first heat exchanger, said third bypass branch having a fifth heat exchanger disposed upstream of a third expansion device.

According to another aspect of the invention, the cooling circuit has:
- an internal heat exchanger having a high-pressure refrigerant fluid inlet and outlet and also a low-pressure refrigerant fluid inlet and outlet,
- a fourth bypass branch connecting the refrigerant fluid outlet of the fifth heat exchanger to the high-pressure refrigerant fluid inlet of the internal heat exchanger, and a fifth bypass branch connecting the high-pressure refrigerant fluid outlet of the internal heat exchanger to the low-pressure refrigerant fluid outlet of said internal heat exchanger, said fifth bypass branch having a fourth expansion device and a sixth heat exchanger, the circuit for thermal management of the batteries by at least partial immersion and/or vaporization having a bypass branch having the sixth heat exchanger connected both to the fifth bypass branch of the cooling circuit and to said bypass branch of the circuit for thermal management of the batteries by at least partial immersion and/or vaporization.

According to another aspect of the invention, the bypass branch of the circuit for thermal management of the batteries by at least partial immersion and/or vaporization connects a first junction point disposed on the main loop of the circuit for thermal management of the batteries by at least partial immersion and/or vaporization upstream of the fourth heat exchanger to a second junction point disposed on the main loop of the circuit for thermal management of the batteries by at least partial immersion and/or vaporization downstream of the third heat exchanger.

According to another aspect of the invention, the cooling circuit is an indirect reversible cooling circuit, the fifth heat exchanger being connected both to the fourth bypass branch of the cooling circuit and to a main loop of an auxiliary heat transfer fluid circulation circuit, the auxiliary heat transfer fluid circulation circuit having, on its main loop, a third pump, a second radiator and said fifth heat exchanger.

According to another aspect of the invention, the auxiliary heat transfer fluid circulation circuit moreover has:
- a first connection branch connecting a first junction point, disposed on the main loop of the auxiliary heat transfer fluid circulation circuit upstream of the second radiator, to a second junction point, disposed on the circuit for thermal management of the power electronics upstream of the fourth heat exchanger,
- a second connection branch connecting a third junction point, disposed on the circuit for thermal management of the power electronics downstream of the fourth heat exchanger, to a fourth junction point, disposed on the main loop of the auxiliary heat transfer fluid circulation circuit downstream of the second radiator.

Figure 2:
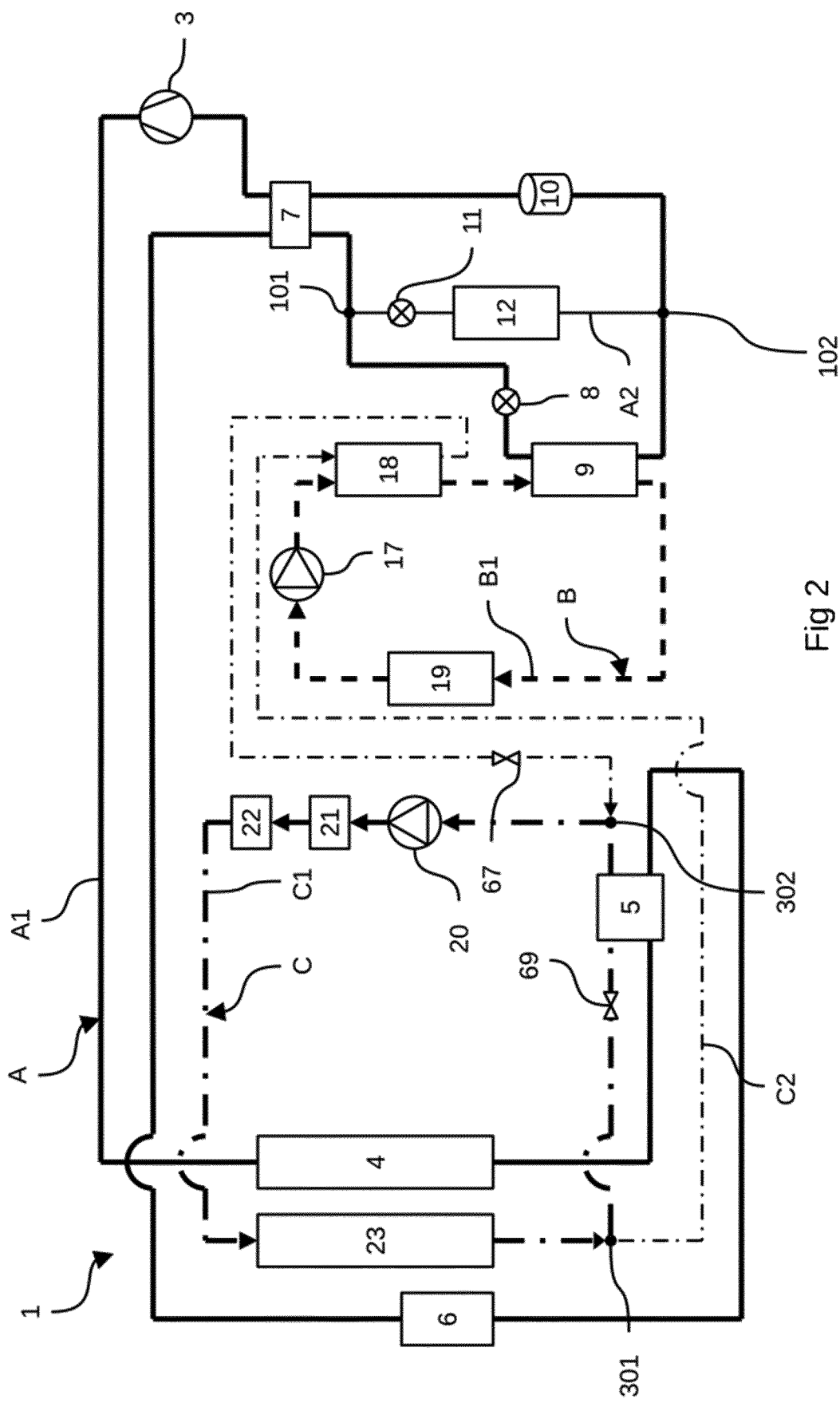
Figure 3:
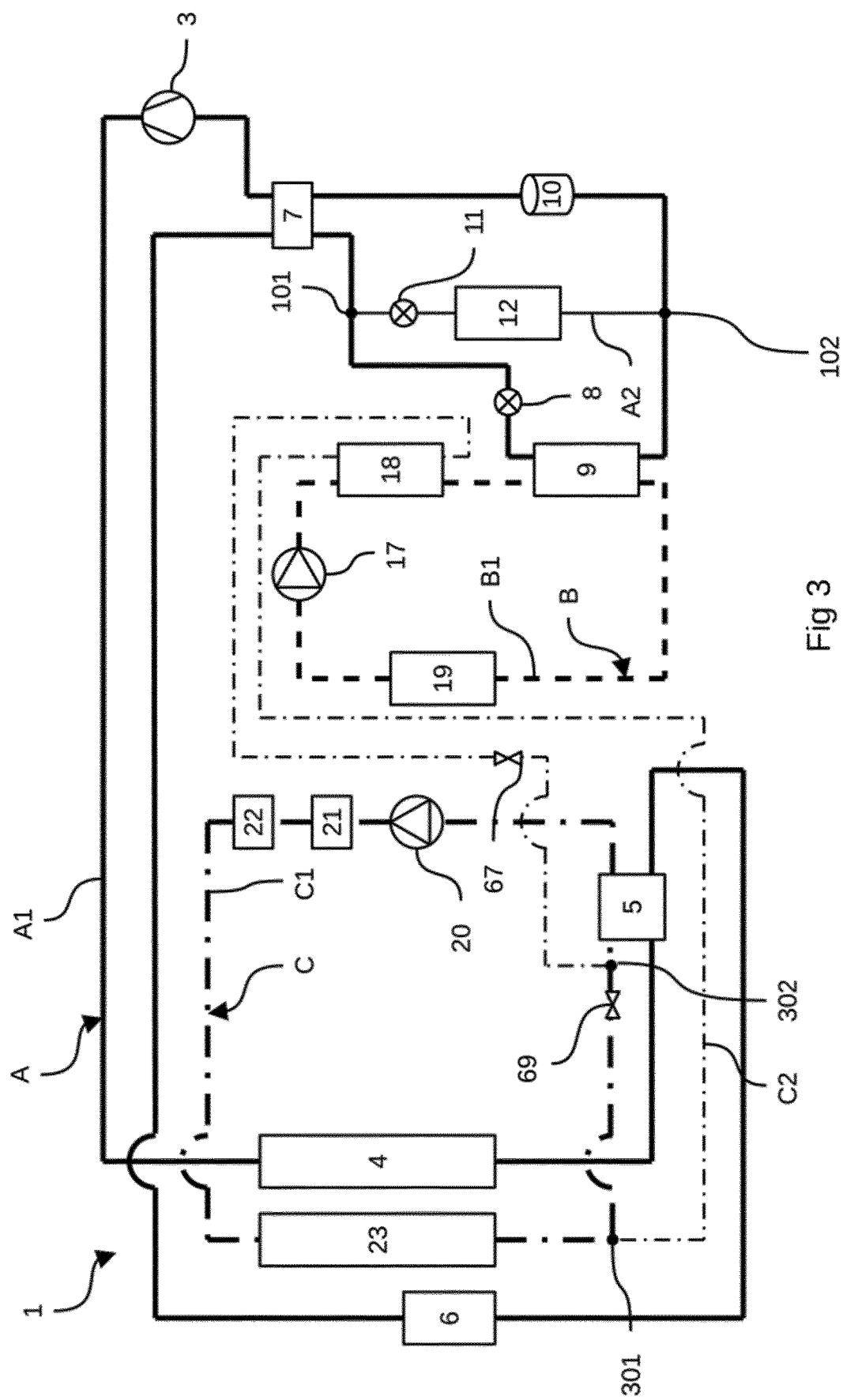
Figure 4:
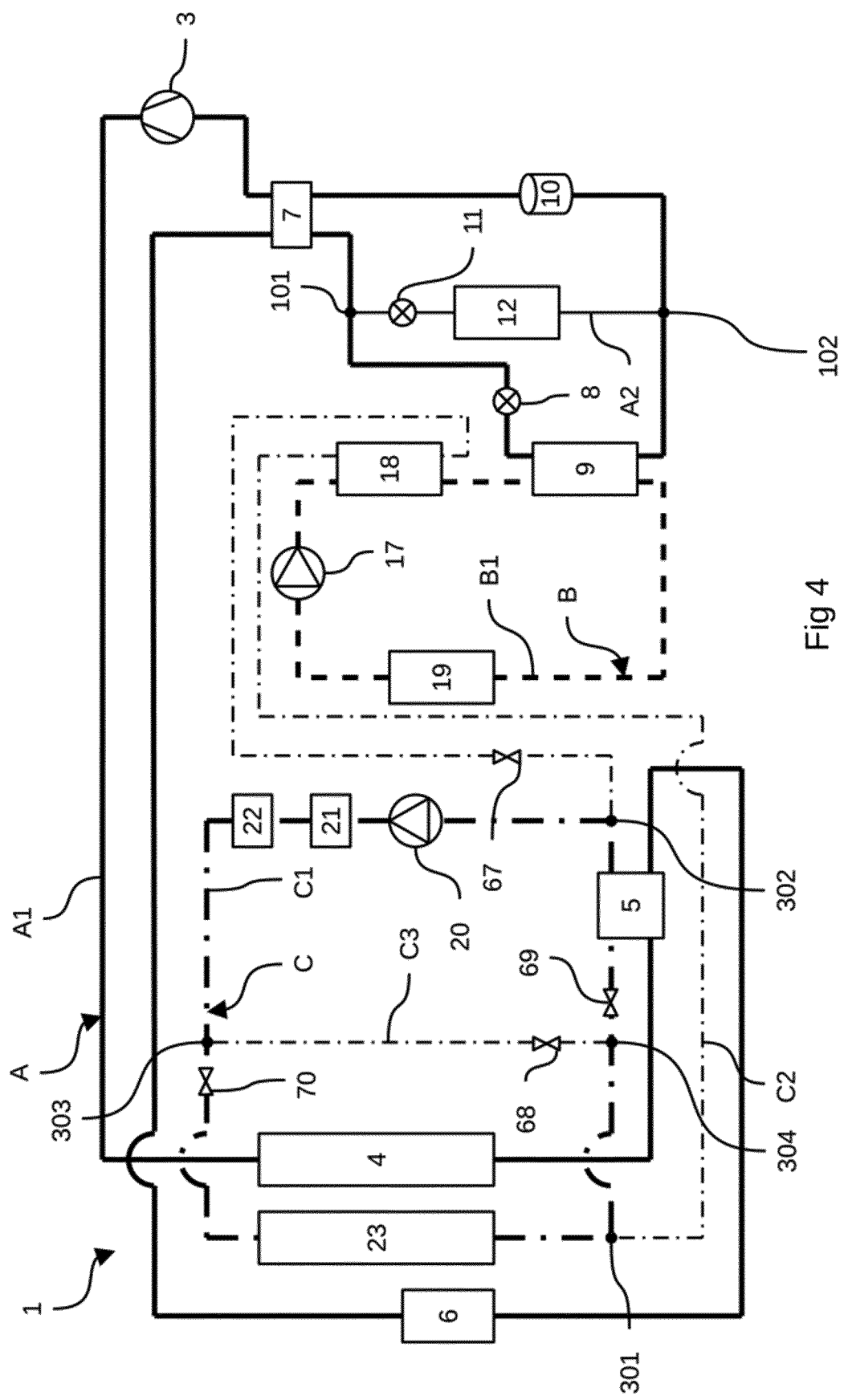
Figure 5:
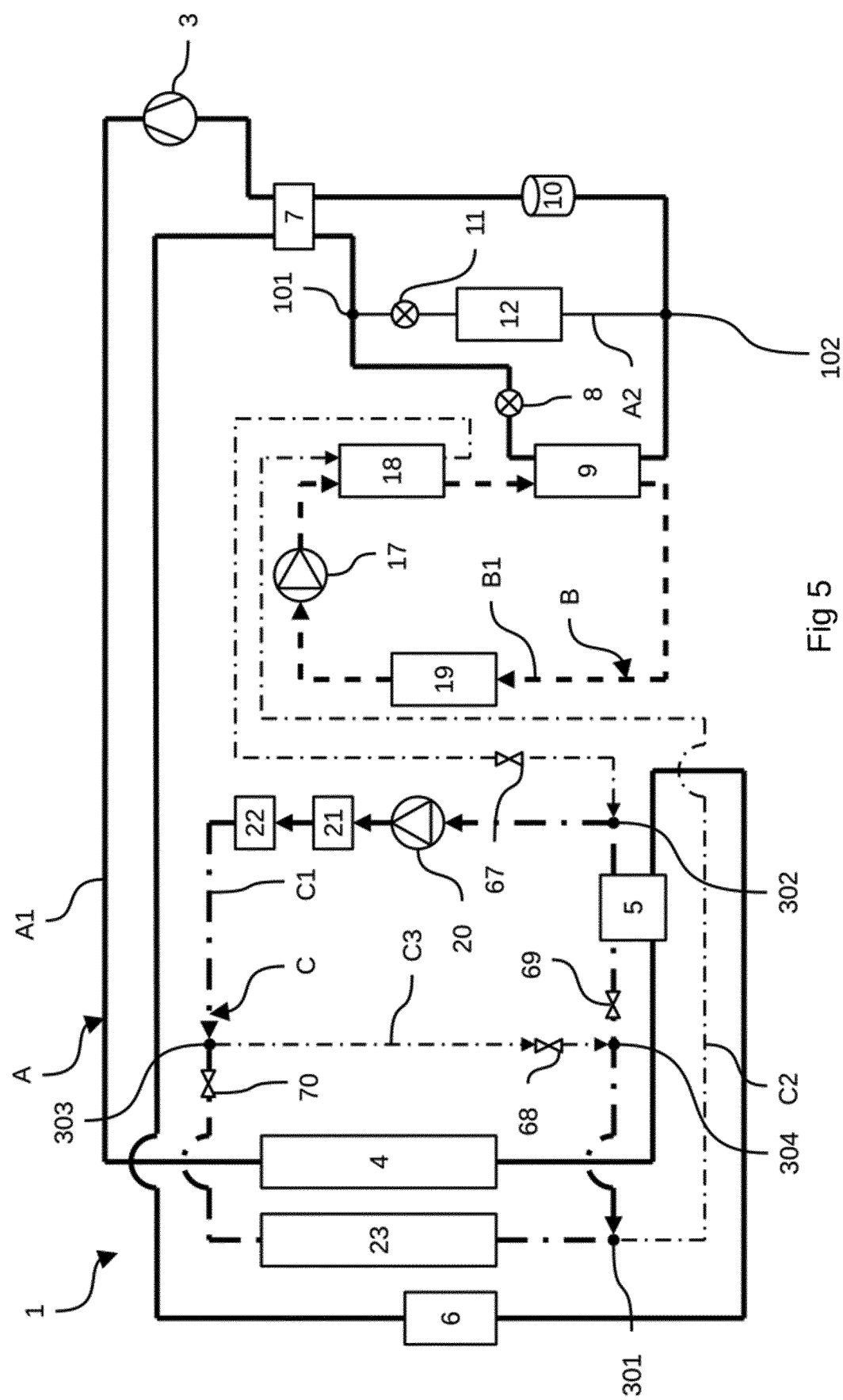
Figure 6:
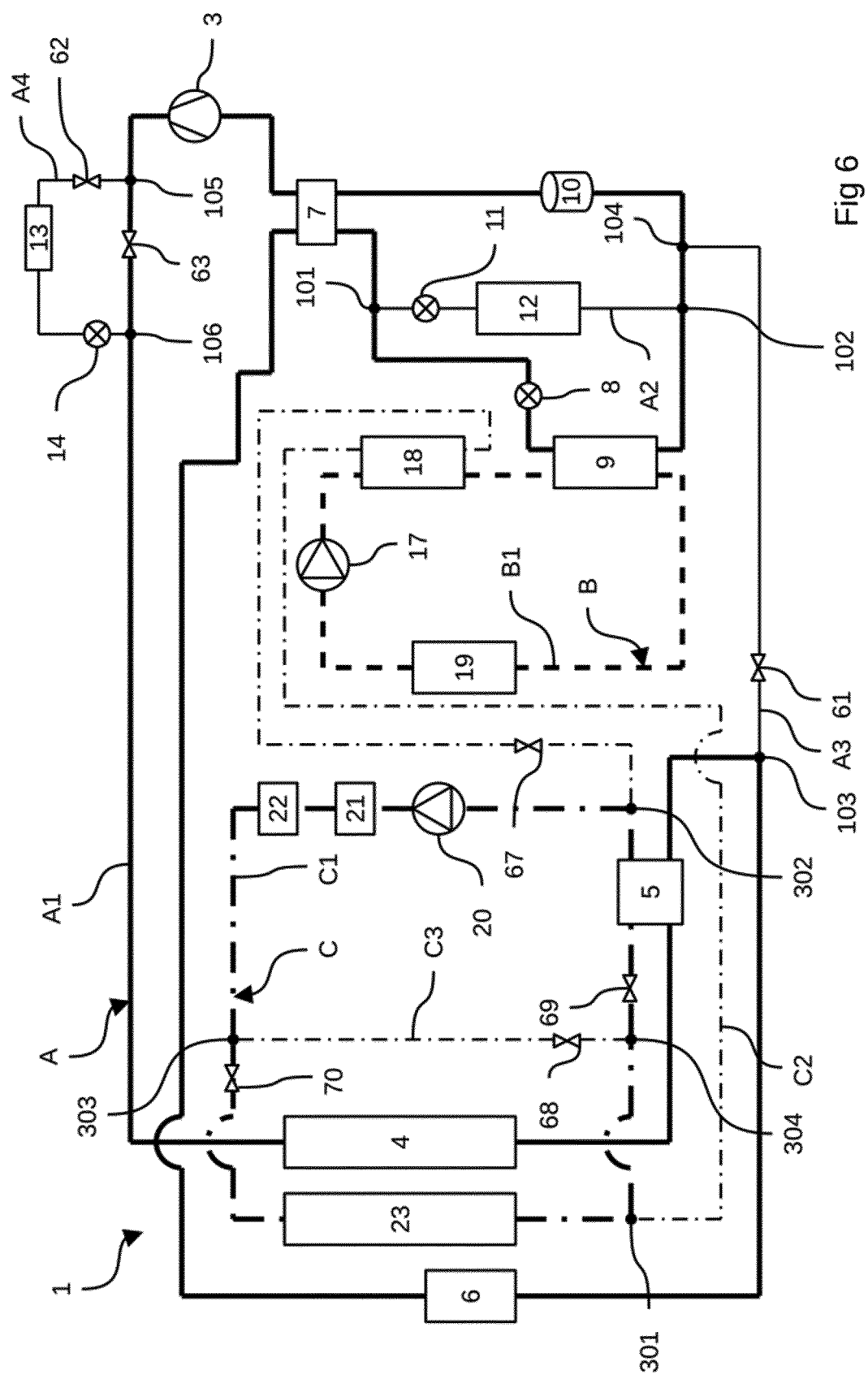
Figure 7:
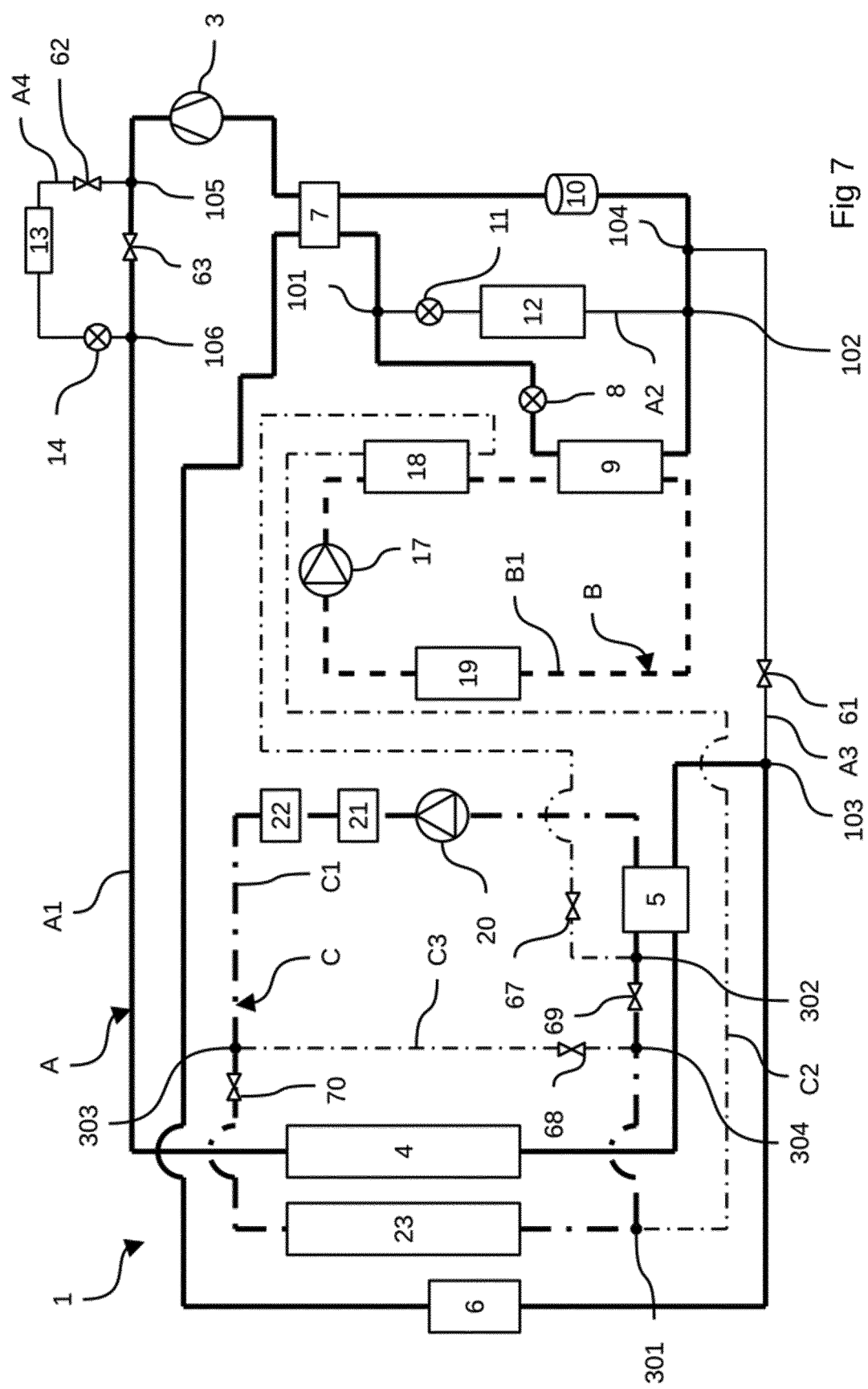
Figure 8:
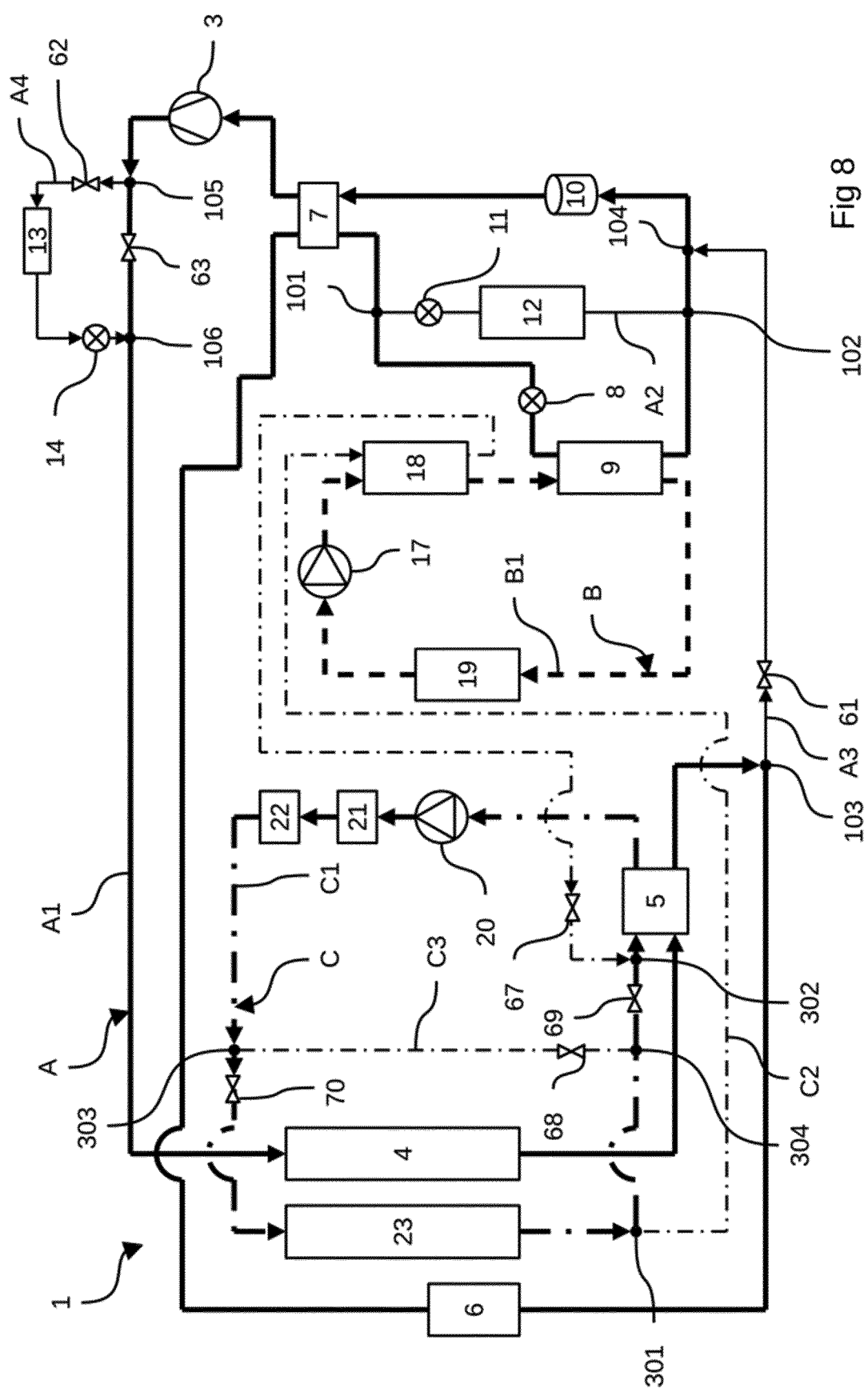
Figure 9:
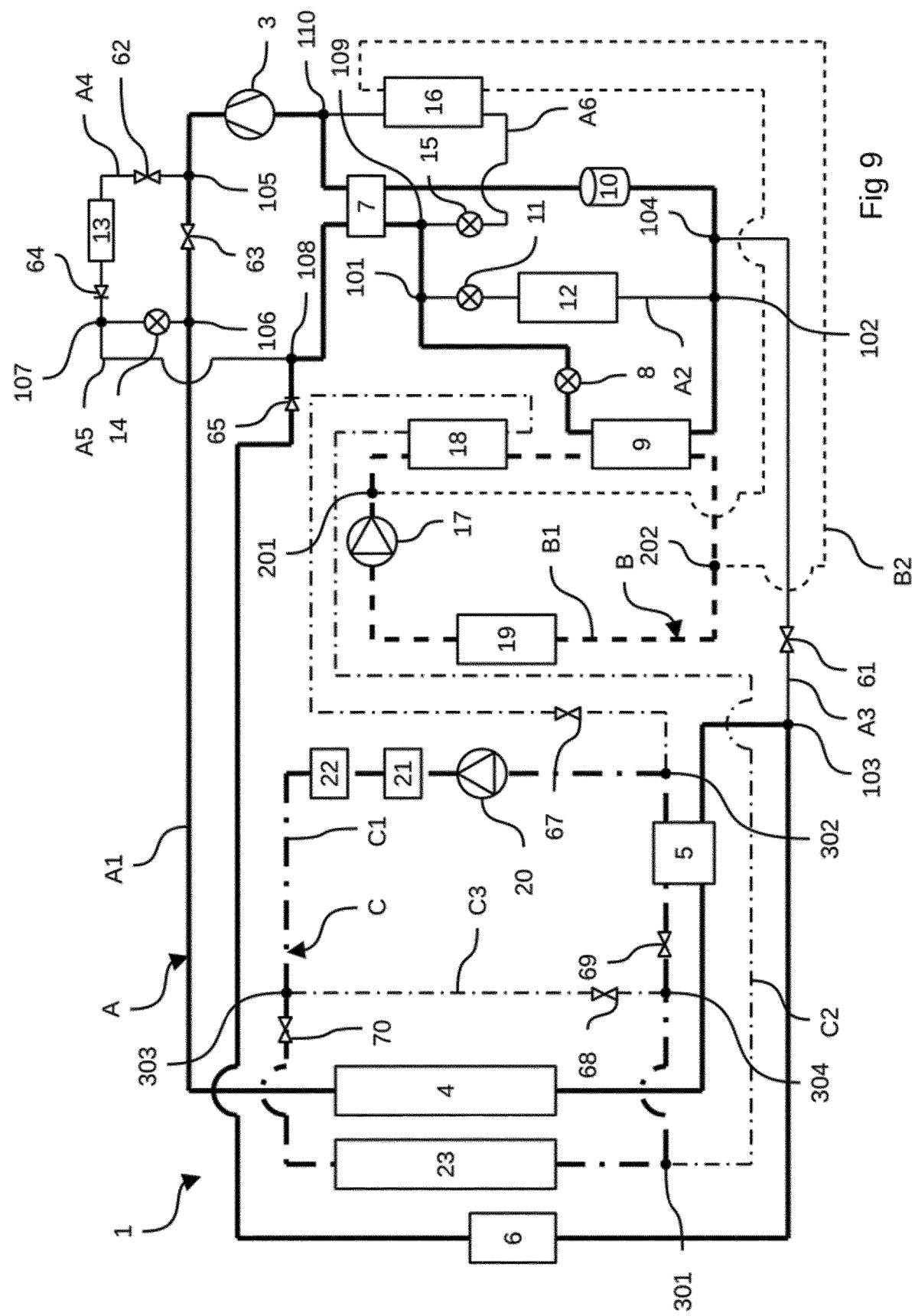
Figure 10:
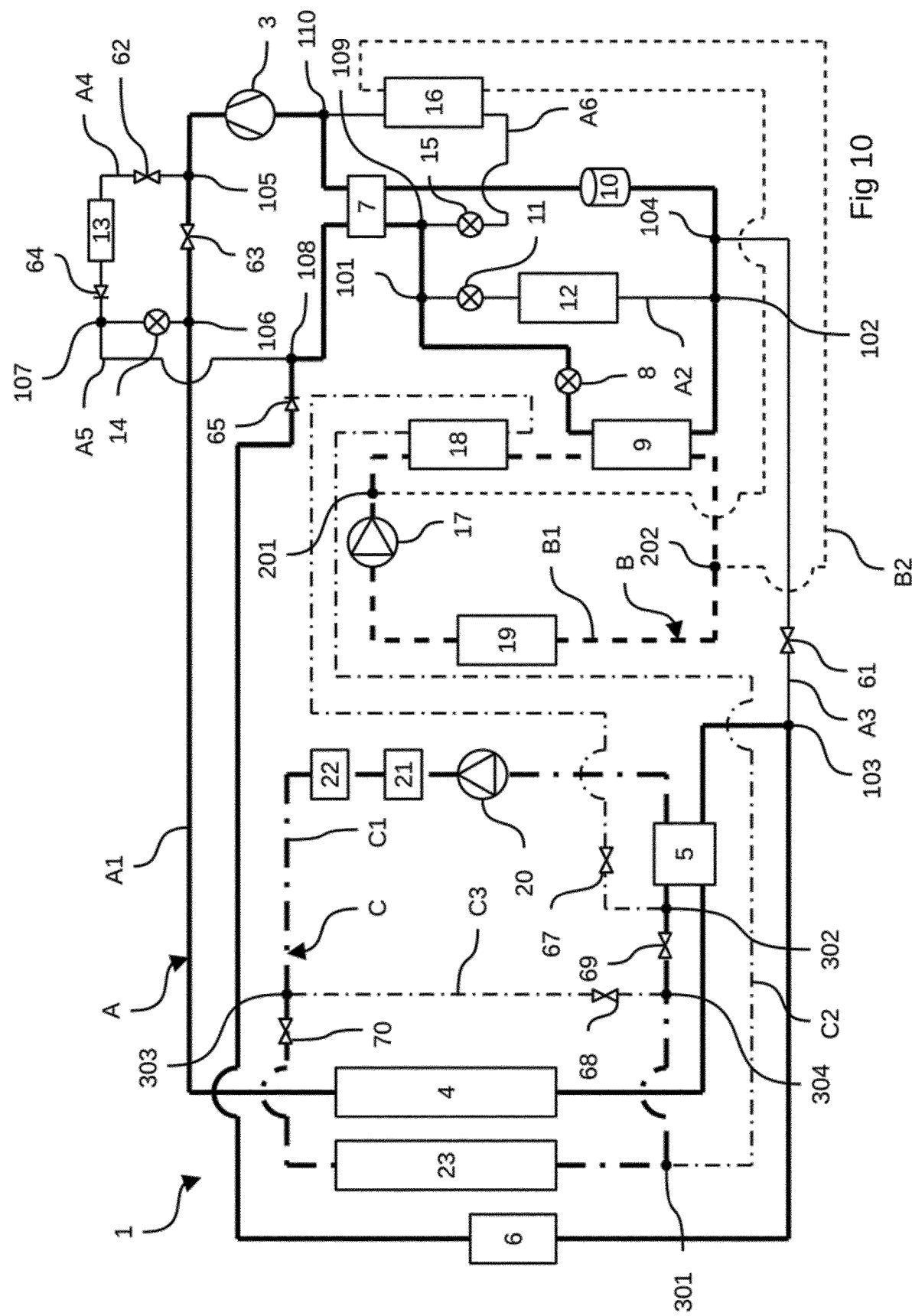
Figure 11:
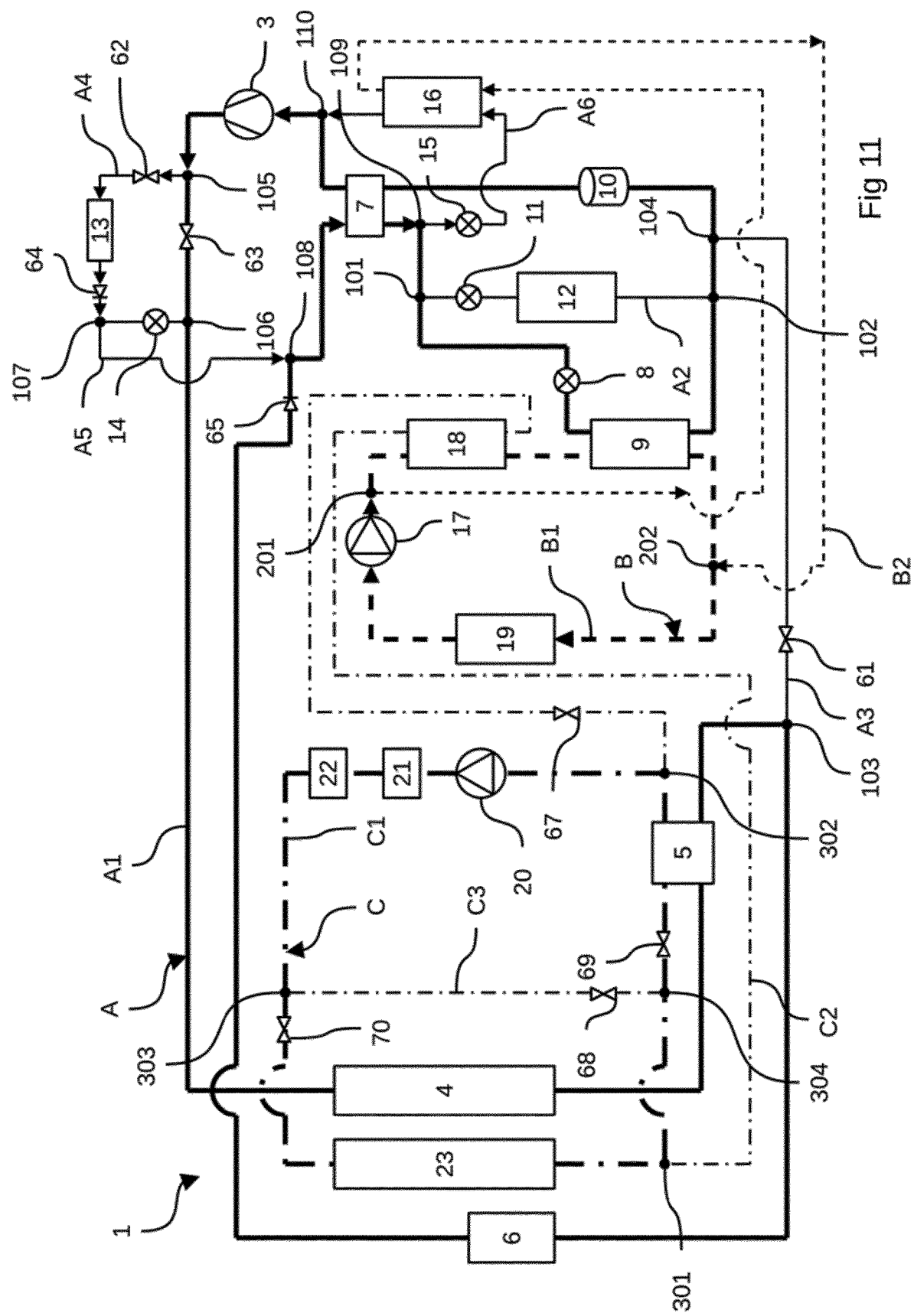
Figure 12:
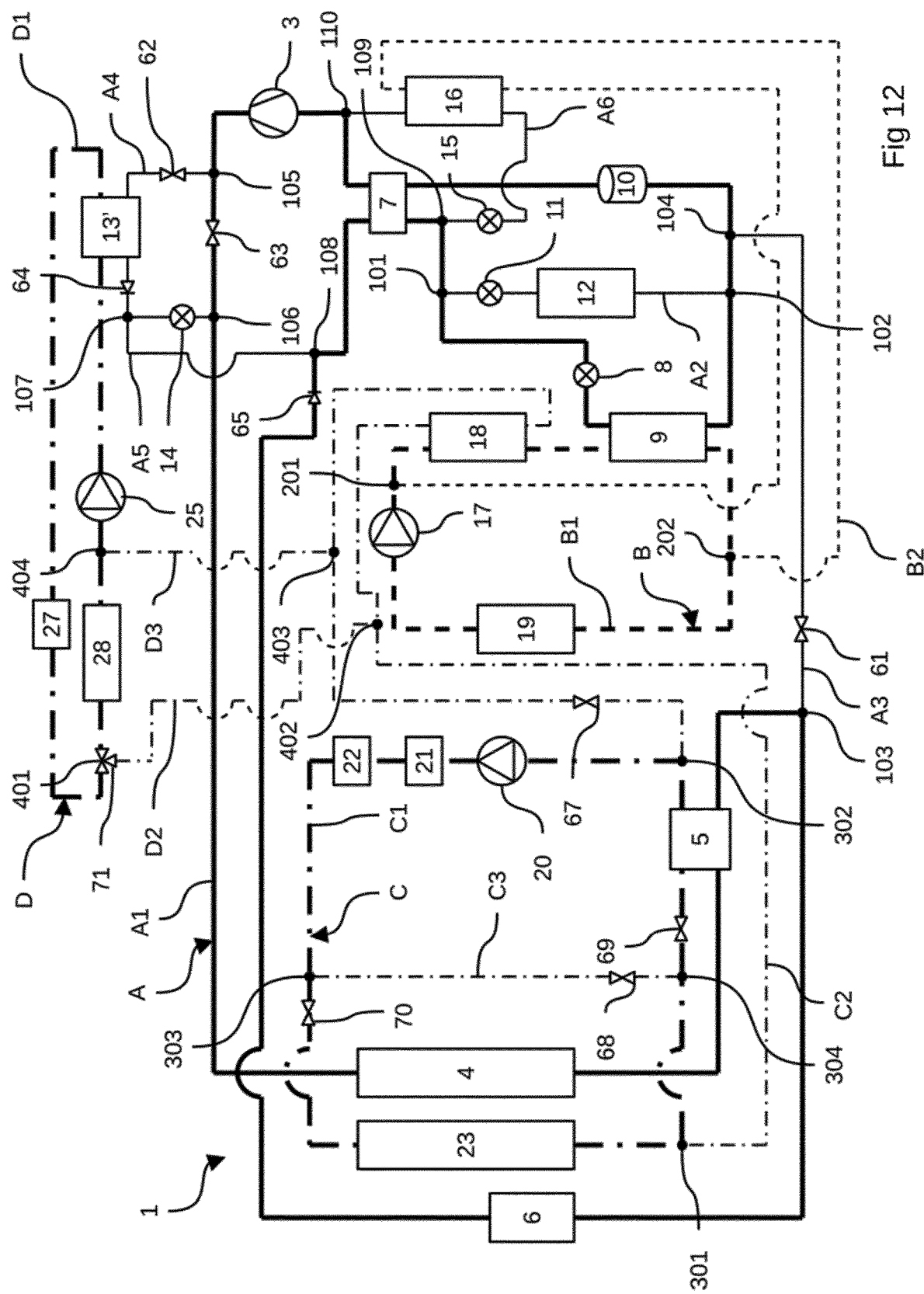
Figure 13:
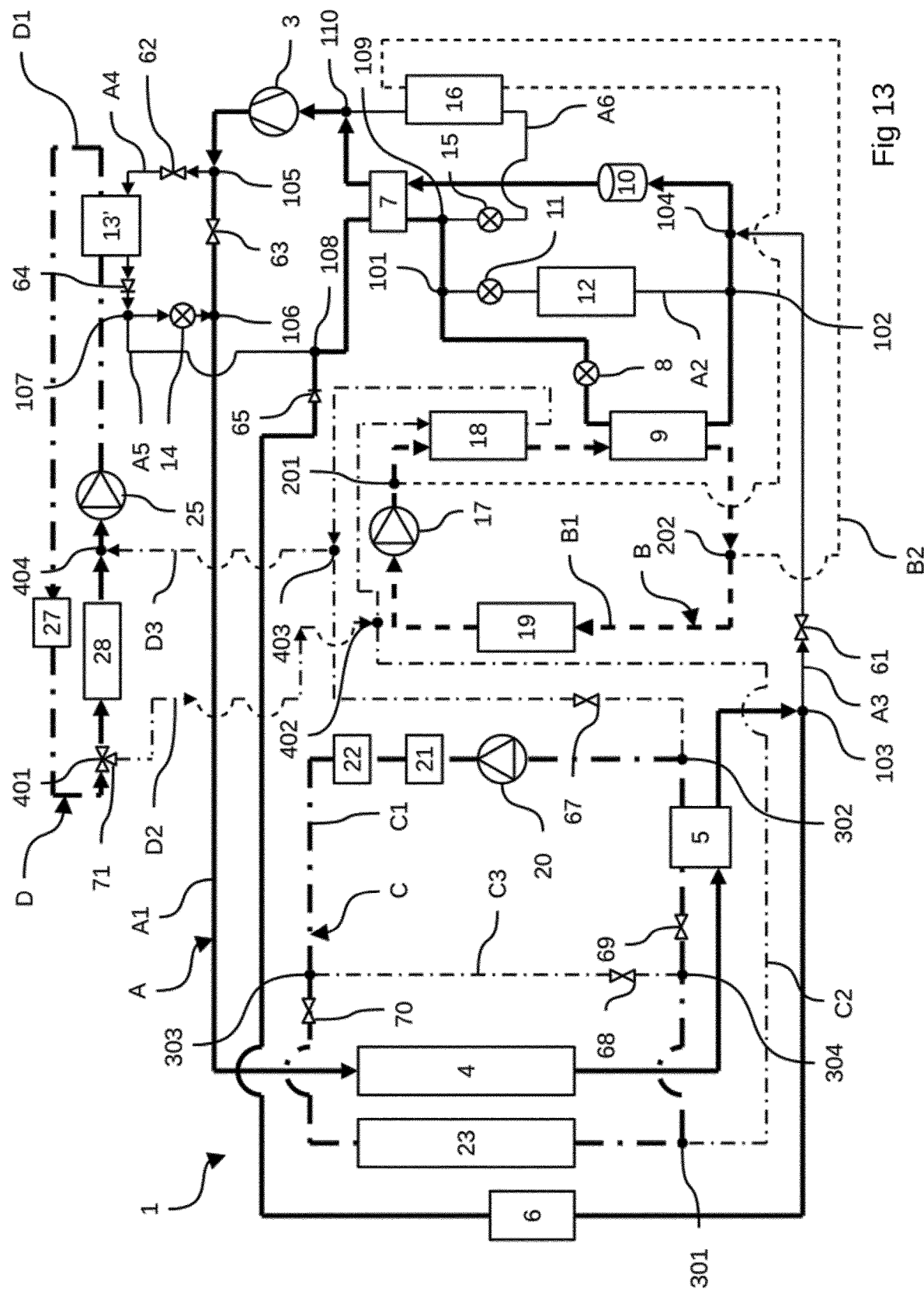

Further features and advantages of the present invention will become more clearly apparent on reading the following description, which is provided by way of non-limiting illustration, and from the appended drawings, in which:

FIG. 1 is a schematic depiction of a thermal management device according to a first embodiment, FIG. 2 is a schematic depiction of the thermal management device of FIG. 1 according to a first mode of operation, FIG. 3 is a schematic depiction of a thermal management device according to a second embodiment, FIG. 4 is a schematic depiction of a thermal management device according to a third embodiment, FIG. 5 is a schematic depiction of the thermal management device of FIG. 4 according to a second mode of operation, FIG. 6 is a schematic depiction of a thermal management device according to a fourth embodiment, FIG. 7 is a schematic depiction of a thermal management device according to a fifth embodiment, FIG. 8 is a schematic depiction of the thermal management device of FIG. 7 according to a third mode of operation, FIG. 9 is a schematic depiction of a thermal management device according to a sixth embodiment, FIG. 10 is a schematic depiction of a thermal management device according to a seventh embodiment, FIG. 11 is a schematic depiction of the thermal management device of FIG. 9 according to a fourth mode of operation, FIG. 12 is a schematic depiction of a thermal management device according to an eighth embodiment, FIG. 13 is a schematic depiction of the thermal management device of FIG. 12 according to a fifth mode of operation.

In the various figures, identical elements bear the same reference numbers.

The following embodiments are examples. Although the description refers to one or more embodiments, this does not necessarily mean that each reference relates to the same embodiment, or that the features apply only to one embodiment. Individual features of different embodiments may also be combined and/or interchanged to provide other embodiments.

In the present description, certain elements or parameters may be indexed, such as, for example, first element or second element and also first parameter and second parameter or else first criterion and second criterion, etc. In this case, this is simple indexing to differentiate and designate elements or parameters or criteria that are similar but not identical. This indexing does not imply that one element, parameter or criterion takes priority over another and such designations can easily be interchanged without departing from the scope of the present description. Neither does this indexing imply a chronological order, for example in evaluating any given criterion.

In the present description, "placed upstream" is understood to mean that one element is placed before another with respect to the direction of circulation of a fluid. By contrast, "placed downstream" is understood to mean that one element is placed after another with respect to the direction of circulation of the fluid.

FIG. 1 shows a thermal management device 1 for an electric or hybrid motor vehicle. This thermal management device 1 has at least three circuits in which various fluids circulate in order to ensure notably the thermal management of batteries and the thermal management of the power electronics. These circuits are notably:
- a cooling circuit A in which a refrigerant fluid is intended, shown in solid lines,
- a circuit B for thermal management of the batteries by at least partial immersion and/or vaporization in which a dielectric heat transfer fluid is intended to circulate, shown by dashes, and
- a circuit C for thermal management of the power electronics in which a heat transfer fluid is intended to circulate, shown by dashes and dots.

The cooling circuit A notably comprises a main loop A1, shown in thick solid lines. This main loop A1 has the following in the direction of circulation of the refrigerant fluid: a compressor 3, a first heat exchanger 4, a second heat exchanger 5, a first expansion device 8 and a third heat exchanger 9.

The first heat exchanger 4 may notably be disposed such that a flow of external air (not shown) can pass through it, for example in the front face of the motor vehicle. The second heat exchanger 5, for its part, is connected both to the main loop A1 of the cooling circuit A and to the circuit C for thermal management of the power electronics. "Both" is understood here to mean that the second heat exchanger 5 is connected to the main loop A1 of the cooling circuit A and also to the circuit C for thermal management of the power electronics so as to make it possible to exchange heat between these two circuits. The third heat exchanger 9, for its part, is connected both to the main loop A1 of the cooling circuit A and to the circuit B for thermal management of the batteries by at least partial immersion and/or vaporization.

The cooling circuit A is notably configured to be able to operate according to a mode for cooling the dielectric heat transfer fluid in the circuit B for thermal management of the batteries by at least partial immersion and/or vaporization by means of the third heat exchanger 9.

The cooling circuit A may moreover have a first bypass branch A2 in parallel with the first expansion device 8 and with the third heat exchanger 9. This first bypass branch A2 has a second expansion device 11 disposed upstream of an evaporator 12. The evaporator 12 may notably be disposed within a heating, ventilation and air conditioning device such that a flow of internal air (not shown) intended for the motor vehicle interior can pass through it.

This first bypass branch A2 more particularly connects a first junction point 101 to a second junction point 102. The first junction point 101 is notably disposed on the main loop A1 of the cooling circuit A downstream of the first heat exchanger 4, between the first heat exchanger 4, between the first heat exchanger 4 and the first expansion device 8 disposed upstream of the third heat exchanger 9. The second junction point 102, for its part, is disposed downstream of the third heat exchanger 9, between said third heat exchanger 9 and the compressor 3.

The main loop A1 of the cooling circuit A may also have an internal heat exchanger 7 configured to make it possible to exchange heat between the high-pressure refrigerant fluid coming from the first heat exchanger 4 and the low-pressure refrigerant fluid coming from the third heat exchanger 9 and/or the evaporator 12. The internal heat exchanger 7 thus has a high-pressure fluid inlet connected downstream of the first heat exchanger 4 and a high-pressure refrigerant fluid outlet connected upstream of the expansion devices 8 and 11, for example upstream of the first junction point 101. The internal heat exchanger 7 also has a low-pressure fluid inlet connected downstream of the third heat exchanger 9 and the evaporator 12, for example downstream of the second junction point 102, and a low-pressure refrigerant fluid outlet connected upstream of the compressor 3. Such an internal heat exchanger 7 notably makes it possible to improve the performance coefficient of the cooling circuit A.

The main loop A1 of the cooling circuit A may also have an accumulator 10 disposed upstream of the compressor 3. More specifically, the accumulator 10 may be disposed upstream of the low-pressure side of the internal heat exchanger 7, between for example the second junction point 102 and the low-pressure fluid inlet of the internal heat exchanger 7.

The cooling circuit A may moreover have a sub-cooler 6 disposed downstream of the second heat exchanger 5. This sub-cooler 6, instead of the first heat exchanger 4, may be disposed such that a flow of external air (not shown) can pass through it, for example in the front face of the motor vehicle. The sub-cooler 6 may notably be disposed between the second heat exchanger 5 and the expansion devices 8 and 11, for example upstream of the first junction point 101 and more specifically upstream of the high-pressure inlet of the internal heat exchanger 7, if present.

The circulation circuit B for thermal management of the batteries by at least partial immersion and/or vaporization, for its part, comprises a main loop B1 having a first pump 17, a fourth heat exchanger 18 and a container 19 configured to receive the batteries. The third heat exchanger 9 is connected both to the main loop A1 of the cooling circuit A and to the main loop B1 of the circuit B for thermal management of the batteries by at least partial immersion and/or vaporization. The fourth heat exchanger 18, for its part, is disposed upstream of the third heat exchanger 9 and downstream of the container 19 in the direction of circulation of the heat transfer fluid. This fourth heat exchanger 18 notably makes it possible to exchange heat between the circulation circuit B for thermal management of the batteries by at least partial immersion and/or vaporization and the circuit C for thermal management of the power electronics.

The circuit C for thermal management of the power electronics comprises a main loop C1 comprising a second pump 20, at least one heat exchanger 21, 22 for exchanging heat with a component of the electric powertrain, a first radiator 23, and the second heat exchanger 5 connected both to the main loop A1 of the cooling circuit A and to the main loop C1 of the circuit C for thermal management of the power electronics.

The first radiator 23, instead of the first heat exchanger 4, may be disposed in the front face of the motor vehicle in order for a flow of internal air to pass through it. Preferably, the first radiator 23 is disposed upstream of the first heat exchanger 4 in the direction of circulation of the flow of external air. In the example illustrated in FIG. 1, the main loop C1 has two heat exchangers 21, 22 dedicated to the components of the electric powertrain. For example, a first heat exchanger 21 for the thermal management of the one or more electric motors and a second heat exchanger 22 for the thermal management of the power electronics.

The circuit C for thermal management of the power electronics moreover has a first bypass branch C2 which has the fourth heat exchanger 18. The fourth heat exchanger 18 is thus connected both to the first bypass branch C2 of the circuit C for thermal management of the power electronics and to the main loop B1 of the circuit B for thermal management of the batteries by at least partial immersion and/or vaporization.

This connection between the first bypass branch C2 of the circuit C for thermal management of the power electronics and the main loop B1 of the circuit B for thermal management of the batteries by at least partial immersion and/or vaporization via the fourth heat exchanger 18 more particularly makes it possible to passively cool down the batteries via the circuit C for thermal management of the power electronics and more particularly via dissipation of heat into the flow of external air by means of the first radiator 23.

FIG. 2 shows an example of the circulation of the various fluids in the circuit B for thermal management of the batteries by at least partial immersion and/or vaporization and in the circuit C for thermal management of the power electronics during such an operating mode for passively cooling the batteries. In this operating mode, the cooling circuit A is more particularly idle. The first shut-off valve 69, for its part, is closed such that the heat transfer fluid at the outlet of the first radiator 23 does not pass through the second exchanger 5 and is redirected to the first bypass branch C2. The shut-off valve 67 of the first bypass branch C2, for its part, is open.

The use of the first radiator 23 to cool down the batteries can thus be realized when the requirements for cooling the batteries are relatively low, for example during a start. Since the circuit C for thermal management of the power electronics consumes more energy than the use of the cooling circuit A in these conditions, this thus makes it possible to reduce the electrical consumption for the thermal management of the batteries and thus makes it possible to increase the range of the vehicle.

The first bypass branch C2 of the circuit C for thermal management of the power electronics connects a first junction point 301 to a second junction point 302. The first junction point 301 is disposed on the main loop C1 of the circuit C for thermal management of the power electronics downstream of the first radiator 23, between said first radiator 23 and the second heat exchanger 5.

In order to allow or to not allow the passage of the heat transfer fluid in the first bypass branch C2, the latter may notably have a controllable shut-off valve 67. The main loop C1, for its part, may have a first shut-off valve 69 disposed between the first junction point 301 and the second junction point 5.

According to a first embodiment of the first bypass branch C2 that is illustrated in FIGS. 1 and 2, the second junction point 302 of the first bypass branch C2 of the circuit C for thermal management of the power electronics may be disposed on the main loop C1 downstream of the second heat exchanger 5, between said second heat exchanger 5 and the at least one heat exchanger 21, 22 for exchanging heat with a component of the electric powertrain. More specifically, in the example illustrated in FIGS. 1 and 2, since the second pump 20 is disposed upstream of the at least one heat exchanger 21, 22 for exchanging heat with a component of the electric powertrain, the second junction point 302 is disposed between the second heat exchanger 5 and the second pump 20.

According to a second embodiment of the first bypass branch C2 that is illustrated in FIG. 3, the second junction point 302 of the first bypass branch C2 of the circuit C for thermal management of the power electronics may be disposed on the main loop C1 downstream of the first junction point 301, between said first junction point 301 and the second heat exchanger 5. More specifically, in the example illustrated in FIG. 3, the second junction point 302 is disposed between the first shut-off valve 69 and the second heat exchanger 5.

FIG. 4 shows a variant of the circuit C for thermal management of the power electronics of FIG. 1. In this variant, the circuit C for thermal management of the power electronics has a second bypass branch C3. This second bypass branch C3 is notably connected to the main loop C1 in parallel with the first radiator 23 in order to allow the heat transfer fluid to bypass the latter. More specifically, the second bypass branch C3 connects a third junction point 303 to a fourth junction point 304. The third junction point 303 is notably disposed on the main loop C1 downstream of the at least one exchanger 21, 22 for exchanging with a component of the electric powertrain, between said at least one exchanger 21, 22 for exchanging with a component of the electric powertrain and the first radiator 23. The fourth junction point 304, for its part, is disposed on the main loop C1 downstream of the first radiator 23, between said first radiator 23 and the second heat exchanger 5. In the example illustrated, the fourth junction point 304 is disposed downstream of the first junction point 301 of the first bypass branch C2. However, it is entirely possible for this fourth junction point 304 to be disposed upstream of the first junction point 301, between the first radiator 23 and said first junction point 301.

This second bypass branch C3 is notably configured to allow the heat transfer fluid to bypass the first radiator 23 and be redirected to the first bypass branch C2. For this, the second bypass branch C3 may have a shut-off valve 68. The main loop C1, for its part, may have a second shut-off valve 70 disposed between the third junction point 303 and the first radiator 23.

As mentioned above, this second bypass branch C3 makes it possible to bypass the first radiator 23 and to redirect the heat transfer fluid to the first bypass branch C2. This thus makes it possible, when the temperature of the components of the powertrain is greater than that of the batteries, to transfer this heat to the circuit B for thermal management of the batteries by at least partial immersion and/or vaporization, in order for example to heat up the batteries, for example during a cold start in low-temperature conditions. This thus makes it possible to heat up the batteries by using the heat dissipated by the components of the powertrain while limiting the electrical energy consumption.

FIG. 5 shows such an operating mode in which the batteries are heated up by using the heat dissipated by the components of the powertrain. In this operating mode, the cooling circuit A is more particularly idle. The second shut-off valve 70 is closed such that the heat transfer fluid at the outlet of the at least one exchanger 21, 22 for exchanging with a component of the electric powertrain does not pass through the first radiator 23 and is redirected to the second bypass branch C3. The first shut-off valve 69, for its part, is closed such that the heat transfer fluid at the outlet of the second bypass branch C3 does not pass through the second exchanger 5 and is redirected to the first bypass branch C2. The shut-off valve 67 of the first bypass branch C2, for its part, is open. The shut-off valve 68 of the second bypass branch C3 is also open.

In the embodiment of the cooling circuit A in FIGS. 1 to 5, said cooling circuit A is configured to operate solely in a cooling mode. According to this embodiment, the first heat exchanger 4 can then only operate as a condenser for the refrigerant fluid.

In another embodiment of the cooling circuit A that is illustrated in FIGS. 6 to 13, the cooling circuit A is reversible. The cooling circuit A is then configured to operate in a cooling mode or in a heat pump mode, as required.

FIGS. 6 and 7 show an example of the architecture of the reversible cooling circuit A. However, other architectures can by all means be envisaged. In this example, the cooling circuit A is similar to the cooling circuit A of FIGS. 1 to 5. The cooling circuit A of FIGS. 6 and 7 moreover has a second bypass branch A3 for bypassing the first expansion device 8, the third heat exchanger 9 and the first bypass branch A2.

The second bypass branch A3 more particularly connects a third junction point 103 to a fourth junction point 104. The first junction point 103 is disposed on the main loop A1 downstream of the second heat exchanger 5, more specifically between said second heat exchanger 5 and the sub-cooler 6. The fourth junction point 104, for its part, is disposed upstream of the compressor 3. More particularly, the fourth junction point 104 is disposed downstream of the third heat exchanger 9 and/or the evaporator 12, notably upstream of the accumulator 10 and the low-pressure inlet of the internal heat exchanger 7. In order to allow or to not allow the passage of the refrigerant fluid in the second bypass branch A3, the latter has a shut-off valve 61.

The cooling circuit A of FIGS. 6 and 7 also has a third bypass branch A4 disposed on the main loop A1 between the compressor 3 and the first heat exchanger 4. This third bypass branch A4 more specifically connects a fifth junction point 105 to a sixth junction point 106. The fifth junction point 105 is disposed on the main loop A1 downstream of the compressor 3, between said compressor 3 and the first heat exchanger 4. The sixth junction point 106, for its part, is disposed on the main loop A1, downstream of the fifth junction point 105, between said fifth junction point 105 and the first heat exchanger 4.

This third bypass branch A4 more specifically has a fifth heat exchanger 13 disposed upstream of a third expansion device 14. The main loop A1, for its part, has a shut-off valve 63 disposed downstream of the fifth junction point 105, between said fifth junction point 105 and the sixth junction point 106 in order to allow or to not allow the refrigerant fluid to enter the third bypass branch A4. The third expansion device 14, for its part, may have a shut-off function in order to prevent the circulation of the refrigerant fluid when it is closed. The fifth heat exchanger 13 may notably be a radiator through which a flow of air intended for the vehicle interior is intended to pass. The fifth heat exchanger 13 may notably be disposed downstream of the evaporator 12 within a heating, ventilation and air conditioning device.

FIG. 6 more particularly shows an embodiment having a reversible cooling circuit A with a first bypass branch C2 of the circuit C for thermal management of the power electronics according to the first embodiment, that is to say when the second junction point 302 is disposed on the main loop C1 downstream of the second heat exchanger 5.

FIG. 7, for its part, shows an embodiment having a reversible cooling circuit A with a first bypass branch C2 of the circuit C for thermal management of the power electronics according to the second embodiment, that is to say when the second junction point 302 is disposed on the main loop C1 downstream of the first junction point 301, between said first junction point 301 and the second heat exchanger 5.

FIG. 8 shows a particular heat pump operating mode of the thermal management device 1 of FIG. 7, in which the first bypass branch C2 is realized according to the second embodiment described above. In this particular mode, the second heat exchanger 5 acts as a cooler for the heat transfer fluid in the circuit C for thermal management of the power electronics and makes it possible to heat up the refrigerant fluid in the cooling circuit A by recovering heat emitted by the at least one heat exchanger 21, 22 for exchanging heat with the power electronics. The fact that the second junction point 302 of the first branch C2 is disposed upstream of the second heat exchanger 5 also makes it possible to recover heat coming from the circuit B for thermal management of the batteries by at least partial immersion and/or vaporization. This thus makes it possible to cool down the batteries while still recovering heat energy to heat up the flow of air toward the vehicle interior via the fifth heat exchanger 13.

FIGS. 9 and 10 show an additional embodiment of the reversible cooling circuit A, which has:
  an internal heat exchanger 7 having a high-pressure refrigerant fluid inlet and outlet and also a low-pressure refrigerant fluid inlet and outlet,
  a fourth bypass branch A5 connecting the refrigerant fluid outlet of the fifth heat exchanger 13 to the high-pressure refrigerant fluid inlet of the internal heat exchanger 7, and
  a fifth bypass branch A6 connecting the high-pressure refrigerant fluid outlet of the internal heat exchanger 7 to the low-pressure refrigerant fluid outlet of said internal heat exchanger 7, said fifth bypass branch A6 having a fourth expansion device 15 and a sixth heat exchanger 16.

The high-pressure inlet and outlet of the internal heat exchanger 7 are notably disposed on the main loop A1 of the cooling circuit A upstream of the first junction point 101, between the second heat exchanger 5, more specifically downstream of the sub-cooler 6, and said first junction point 101. The low-pressure inlet and outlet of the internal heat exchanger 7 are notably disposed on the main loop A1 of the cooling circuit A upstream of the compressor 3, between the fourth junction point 104, more specifically downstream of the accumulator 10, and said compressor 3.

FIG. 9 more particularly shows this additional embodiment when the first bypass branch C2 of the circuit C for thermal management of the power electronics is realized according to the first embodiment, that is to say when the second junction point 302 is disposed on the main loop C1 downstream of the second heat exchanger 5. FIG. 10, for its part, shows this additional embodiment when the first bypass branch C2 of the circuit C for thermal management of the power electronics is realized according to the second embodiment, that is to say when the second junction point 302 is disposed on the main loop C1 downstream of the first junction point 301, between said first junction point 301 and the second heat exchanger 5.

In the example in FIGS. 9 and 10, the fourth bypass branch A5 more particularly connects a seventh junction point 107 to an eighth junction point 108. The seventh junction point 107 is more particularly disposed on the third bypass branch A4 between the fifth heat exchanger 13 and the third expansion device 14. The eighth junction point 108, for its part, is disposed on the main loop A1 upstream of the high-pressure inlet of the internal heat exchanger 7, between the second heat exchanger 5 or the sub-cooler 6 and said internal heat exchanger 7.

The fifth bypass branch A6, for its part, may connect a ninth junction point 109 to a tenth junction point 110. In the example in FIG. 9, the ninth junction point 109 is disposed on the main loop A1 downstream of the high-pressure outlet of the internal heat exchanger 7, between said internal heat exchanger 7 and the first expansion device 8 or the first junction point 101. The tenth junction point 110, for its part, is disposed on the main loop A1 downstream of the low-pressure outlet of the internal heat exchanger 7, between said internal heat exchanger 7 and the compressor 3.

The third bypass branch A4 may in this case have a non-return valve 64 disposed upstream of the seventh junction point 107 to avoid reflux toward the fifth heat exchanger 13. The main loop A1, for its part, may also have a non-return valve 65 disposed upstream of the eighth junction point 108 of the fourth bypass branch A5, between the third junction point of the second bypass branch A3 and the eighth junction point 108, more specifically downstream of the sub-cooler 6. This non-return valve makes it possible to avoid reflux notably toward the first heat exchanger 4.

In the embodiment of FIGS. 9 and 10, the circuit B for thermal management of the batteries by at least partial immersion and/or vaporization also has a bypass branch B2 having the sixth heat exchanger 16 connected both to the fifth bypass branch A6 of the cooling circuit A and to said bypass branch B2 of the circuit B for thermal management of the batteries by at least partial immersion and/or vaporization.

This bypass branch B2 can more particularly connect a first junction point 201 to a second junction point 202. The first junction point 201 is preferably disposed on the main loop B1 of the circuit B for thermal management of the batteries by at least partial immersion and/or vaporization downstream of the container 19, between said container 19 and the fourth heat exchanger 18. The second junction point 202, for its part, may be disposed on the main loop B1 of the circuit B for thermal management of the batteries by at least partial immersion and/or vaporization downstream of the third heat exchange 9, between said third heat exchanger 9 and the container 19.

FIG. 11 shows a heat pump operating mode according to the architecture of the thermal management device 1 of FIG. 9. Such a heat pump operating mode is also possible according to the architecture of the thermal management device 1 of FIG. 10. In this operating mode, the heat recovered while cooling the batteries at the circuit B for thermal management of the batteries by at least partial immersion and/or vaporization is used to heat up the flow of air intended for the vehicle interior via the fifth heat exchanger 13.

For this, during operation, the refrigerant fluid in the cooling circuit A passes through the compressor 3 and reaches the fifth heat exchanger 13 via the third bypass branch A4, since the shut-off valve 63 is closed. At the outlet of the fifth heat exchanger 13, the refrigerant fluid reaches the high-pressure fluid inlet of the internal heat exchanger 7 directly and enters the fifth bypass branch A6. For this, the refrigerant fluid passes through the fourth bypass branch A5 since the third expansion device 14, which has a shut-off function for blocking the flow of refrigerant fluid, is closed. Passing through the fifth bypass branch A6 and thus bypassing the low-pressure side of the internal heat exchanger 7 makes it possible to avoid excessive overheating of the refrigerant fluid, which could damage the compressor 3.

FIG. 12 also shows an embodiment in which the cooling circuit A is reversible. In this embodiment, the heat pump is referred to as indirect, that is to say the fifth heat exchanger 13' is connected both to the fourth bypass branch A4 of the cooling circuit A and to a main loop D1 of an auxiliary heat transfer fluid circulation circuit D. Reference is made to an indirect heat pump because the fifth heat exchanger 13' is not in direct contact with the flow of air intended for the vehicle interior but makes it possible to heat up said flow of air intended for the vehicle interior indirectly, via the auxiliary heat transfer fluid circulation circuit D.

This auxiliary heat transfer fluid circulation circuit D has, on its main loop D1, a third pump 25, a second radiator 28 and said fifth heat exchanger 13'. The second radiator 28 is more particularly intended to be passed through by a flow of air intended for the vehicle interior. The second radiator 28 may notably be disposed downstream of the evaporator 12 within a heating, ventilation and air conditioning device. The main loop D1 of the auxiliary heat transfer fluid circulation circuit D may also have an electric heater 27 for the heat transfer fluid disposed downstream of the fifth heat exchanger 13', between said fifth heat exchanger 13' and the second radiator 28.

The auxiliary heat transfer fluid circulation circuit D may also have a first D2 and a second D3 branch for connection to the circuit C for thermal management of the power electronics.

The first connection branch D2 notably connects a first junction point 401, disposed on the main loop D1 of the auxiliary heat transfer fluid circulation circuit D upstream of the second radiator 28, to a second junction point 402, disposed on the circuit C for thermal management of the power electronics upstream of the fourth heat exchanger 18. As illustrated in FIG. 12, this second junction point 402 may be disposed on the first bypass branch C2 of the circuit C for thermal management of the power electronics upstream of the fourth heat exchanger 18. An alternative (not shown) may also be to dispose the second junction point 402 on the main loop C1 of the circuit C for thermal management of the power electronics upstream of the first junction point 301 of its first bypass branch C2.

The second connection branch D3, for its part, connects a third junction point 403, disposed on the circuit C for thermal management of the power electronics downstream of the fourth heat exchanger 18, to a fourth junction point 404, disposed on the main loop D1 of the auxiliary heat transfer fluid circulation circuit D downstream of the second radiator 28. As illustrated in FIG. 12, the third junction point 403 may be disposed on the first bypass branch C2 of the circuit C for thermal management of the power electronics downstream of the fourth heat exchanger 18. An alternative (not shown) may also be to dispose the third junction point 403 on the main loop C1 of the circuit C for thermal management of the power electronics downstream of the second junction point 302 of its first bypass branch C2.

In order to allow or to not allow the heat transfer fluid to circulate between the auxiliary heat transfer fluid circulation circuit D and the circuit C for thermal management of the power electronics, a three-way valve 71 may be disposed at the first junction point 401 of the first connection branch D2. Other means, such as variable-opening valves, may by all means also be envisaged.

FIG. 13 shows an operating mode in which this connection between the auxiliary heat transfer fluid circulation circuit D and the circuit C for thermal management of the power electronics is particularly advantageous.

In this operating mode, the reversible cooling circuit A operates in a heat pump mode. The refrigerant fluid enters the compressor 3, the third bypass branch A4, the first heat exchanger 4, the second heat exchanger 5 and the second bypass branch A3, before returning to the compressor 3. Heat is thus recovered at the first heat exchanger 4 for transfer to the auxiliary heat transfer fluid circulation circuit D via the fifth heat exchanger 13'.

Within the auxiliary heat transfer fluid circulation circuit D, the heat transfer fluid is propelled by the third pump 25 and passes through the fifth heat exchanger 13', where it is heated up. At the first junction point 401 of the first connection branch D2, some or all of the heat transfer fluid is redirected through said first connection branch D2 to circulate through the fourth heat exchanger 18. As it passes through the fourth heat exchanger 18, the heat transfer fluid heats up the dielectric heat transfer fluid in the circuit B for thermal management of the batteries by at least partial immersion and/or vaporization and thus makes it possible to heat up the batteries. The heat transfer fluid then reaches the main branch D1 of the auxiliary heat transfer fluid circulation circuit D via the second connection branch D3. Also at the first junction point 401 of the first connection branch D2, some of the heat transfer fluid can be redirected through the second radiator 28 to heat up the flow of air intended for the vehicle interior.

Thus, it can be clearly seen that the thermal management device 1, on account of its architecture, enables various operating modes, notably in order to passively cool down the batteries in certain conditions in order to consume as little electrical energy as possible.

The invention claimed is:
1. A thermal management device for an electric or hybrid motor vehicle, the device comprising:
a cooling circuit configured to circulate a refrigerant fluid, wherein the cooling circuit comprises a main loop comprising the following in the direction of circulation of the refrigerant fluid, a compressor, a first heat exchanger, a second heat exchanger, a first expansion device, and a third heat exchanger, a circuit for thermal management of the batteries by at least partial immersion and/or vaporization,
  wherein the battery thermal management circuit is configured to circulate a dielectric heat transfer fluid,
wherein the circulation circuit for thermal management of the batteries by at least partial immersion and/or vaporization comprises:
  a main loop comprising a first pump,
  a fourth heat exchanger and
  a container configured to receive the batteries,
wherein the third heat exchanger is connected both to the main loop of the cooling circuit and to the main loop of the circuit for thermal management of the batteries by at least partial immersion and/or vaporization,
wherein the fourth heat exchanger is disposed upstream of the third heat exchanger and downstream of the container, and
a circuit for thermal management of the power electronics,
wherein the power electronic thermal management circuit is configured to circulate a heat transfer fluid and comprises a main loop comprising:
  a second pump,
  at least one heat exchanger for exchanging heat with a component of the electric powertrain,
  a first radiator, and
  the second heat exchanger connected both to the main loop of the cooling circuit and to the main loop of the circuit for thermal management of the power electronics,
wherein the circuit for thermal management of the power electronics further comprises a first bypass branch,
wherein the first bypass branch comprises the fourth heat exchanger, and
wherein the fourth heat exchanger is connected both to said first bypass branch of the circuit for thermal management of the power electronics and to the main loop of the circuit for thermal management of the batteries by at least partial immersion and/or vaporization.

2. The thermal management device as claimed in claim 1, wherein the first bypass branch of the circuit for thermal management of the power electronics connects a first junction point disposed on the main loop of the circuit for thermal management of the power electronics downstream of the first radiator, between the first radiator and the second heat exchanger, to a second junction point disposed on the main loop of the circuit for thermal management of the power electronics downstream of the second heat exchanger, between the second heat exchanger and the at least one heat exchanger for exchanging heat with a component of the electric powertrain.

3. The thermal management device as claimed in claim 1, wherein the first bypass branch of the circuit for thermal management of the power electronics connects a first junction point disposed on the main loop of the circuit for thermal management of the power electronics downstream of the first radiator, between the first radiator and the second heat exchanger, to a second junction point disposed on the main loop of the circuit for thermal management of the power electronics downstream of the first junction point, between the first junction point and the second heat exchanger.

4. The thermal management device as claimed in claim 1, wherein the circuit for thermal management of the power electronics comprises a second bypass branch connected to the main loop in parallel with the first radiator.

5. The thermal management device as claimed in claim 1, wherein the cooling circuit is reversible.

6. The thermal management device as claimed in claim 5, wherein the cooling circuit comprises:
a second bypass branch connecting a third junction point, disposed on the main loop downstream of the second heat exchanger, to a fourth junction point disposed upstream of the compressor,
a third bypass branch disposed on the main loop and connecting a fifth junction point, disposed on the main loop downstream of the compressor, between the compressor and the first heat exchanger, to a sixth junction point disposed on the main loop downstream of the fifth junction point, between the fifth junction point and the first heat exchanger,
wherein the third bypass branch comprises a fifth heat exchanger disposed upstream of a third expansion device.

7. The thermal management device as claimed in claim 1, wherein the cooling circuit comprises:
an internal heat exchanger comprising a high-pressure refrigerant fluid inlet and outlet and also a low-pressure refrigerant fluid inlet and outlet,
a fourth bypass branch connecting the refrigerant fluid outlet of the fifth heat exchanger to the high-pressure refrigerant fluid inlet of the internal heat exchanger, and
a fifth bypass branch connecting the high-pressure refrigerant fluid outlet of the internal heat exchanger to the low-pressure refrigerant fluid outlet of the internal heat exchanger,
  wherein the fifth bypass branch comprises a fourth expansion device and a sixth heat exchanger,
wherein the circuit for thermal management of the batteries by at least partial immersion and/or vaporization comprises a bypass branch comprising the sixth heat exchanger connected both to the fifth bypass branch of the cooling circuit and to the bypass branch of the circuit for thermal management of the batteries by at least partial immersion and/or vaporization.

8. The thermal management device as claimed in claim 7, wherein the bypass branch of the circuit for thermal management of the batteries by at least partial immersion and/or vaporization connects a first junction point disposed on the main loop of the circuit for thermal management of the batteries by at least partial immersion and/or vaporization upstream of the fourth heat exchanger to a second junction point disposed on the main loop of the circuit for thermal management of the batteries by at least partial immersion and/or vaporization downstream of the third heat exchanger.

9. The thermal management device as claimed in claim 6, wherein the cooling circuit is an indirect reversible cooling circuit,
wherein the fifth heat exchanger is connected both to the fourth bypass branch of the cooling circuit and to a main loop of an auxiliary heat transfer fluid circulation circuit,
wherein the auxiliary heat transfer fluid circulation circuit comprises, on its main loop, a third pump, a second radiator and the fifth heat exchanger.

10. The thermal management device as claimed in claim 1, wherein the auxiliary heat transfer fluid circulation circuit further comprises:

a first connection branch connecting a first junction point, disposed on the main loop of the auxiliary heat transfer fluid circulation circuit upstream of the second radiator, to a second junction point, disposed on the circuit for thermal management of the power electronics upstream of the fourth heat exchanger, a second connection branch connecting a third junction point, disposed on the circuit for thermal management of the power electronics downstream of the fourth heat exchanger, to a fourth junction point, disposed on the main loop of the auxiliary heat transfer fluid circulation circuit downstream of the second radiator.

* * * * *